Feb. 18, 1969  J. E. LEONE ET AL  3,428,915

MIRROR SUPPORTING STRUCTURE FOR LASERS

Filed Feb. 15, 1965

INVENTORS
JAMES E. LEONE
ERNEST C. WETTSTEIN
BY
AGENT

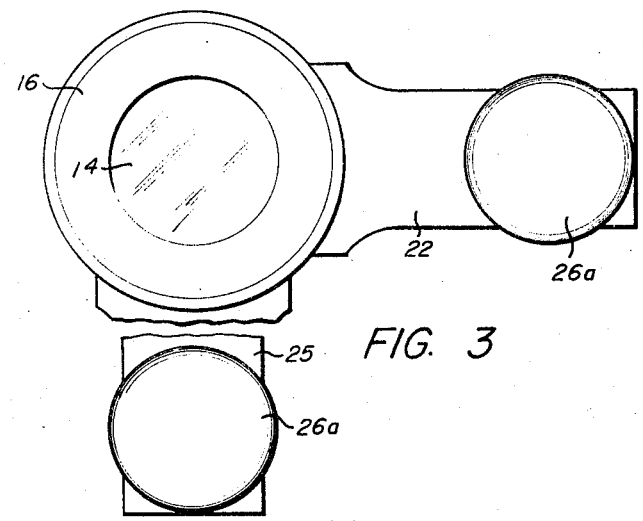
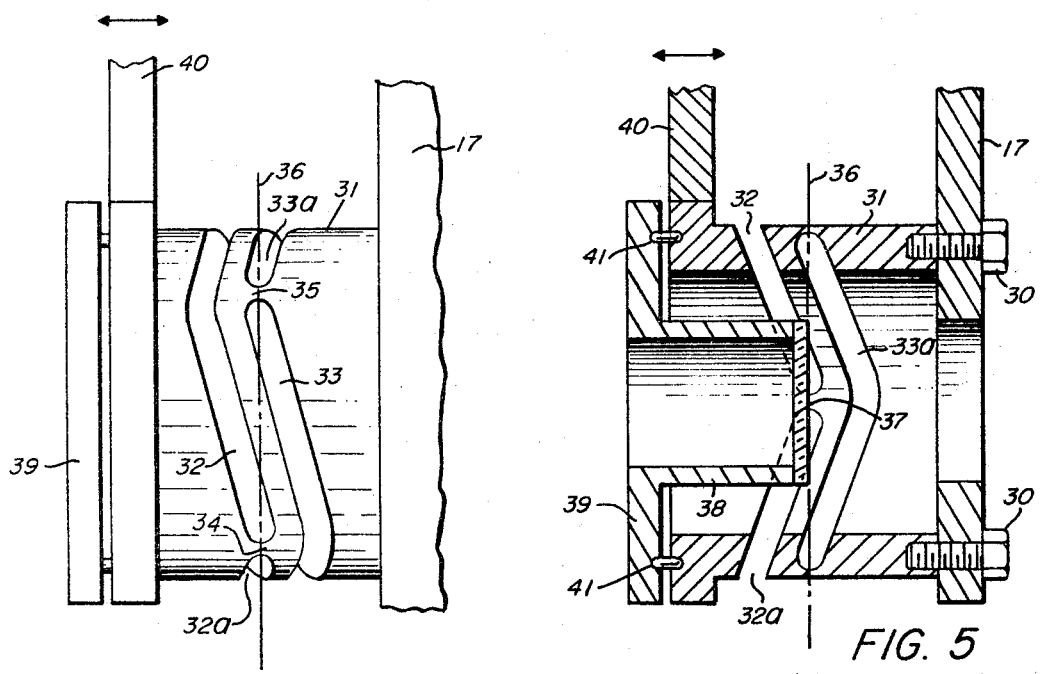

United States Patent Office 3,428,915
Patented Feb. 18, 1969

1

3,428,915
MIRROR SUPPORTING STRUCTURE FOR LASERS
James E. Leone, Sudbury, and Ernest C. Wettstein, Acton, Mass., assignors to Raytheon Company, Lexington, Mass., a corporation of Delaware
Filed Feb. 15, 1965, Ser. No. 432,458
U.S. Cl. 331—94.5       13 Claims
Int. Cl. H01s 3/02; G02b 7/18; G02f 1/34

ABSTRACT OF THE DISCLOSURE

A laser structure comprising a resonant cavity having reflecting means at each end, one of the reflecting means comprising a mirror positioned in the path of radiation, the mirror being supported by adjustable means whereby the mirror may be angled as desired with respect to the path of said radiation.

---

This invention relates to laser structures and has particular reference to devices for providing angular adjustment of laser mirrors.

In the operation of lasers it is extremely important that the positions of the laser mirrors, that is those mirrors which form the resonant optical cavity, be precisely adjusted so that, in the case of flat mirrors, they be maintained effectively parallel and, in the case of spherical mirrors, their radii of curvature are aligned to within seconds of arc.

Prior art laser structures employed various relatively unsatisfactory means for adjusting the mirrors, such as helical spring devices and differential screws. However, such means were generally extremely sensitive to mechanical vibration, relatively expensive to fabricate, and difficult to critically and accurately adjust. Further, particularly the spring devices, they inherently possessed undesirable resonance which occurred when the devices were subjected to mechanical shock or vibration, and exhibited undesirable backlash. Additionally, known prior art devices did not possess the desired smoothness and criticality required.

In accordance with this invention, there has been provided a novel and efficient mirror supporting and adjusting structure which is relatively insensitive to mechanical vibration or shock, simple and inexpensive to construct and operate, and smooth and sensitive in its operation. These beneficial objectives are achieved by the provision of a laser structure having a mirror at each end of the resonant cavity, with at least one of the mirrors being adjustable with respect to a fixed frame by an adjusting device constructed in accordance with this invention. Each adjusting device comprises means for supporting a mirror so that its reflecting surface directs radiation from the cavity back into the cavity, which means includes a support upon which the mirror is mounted, a cylindrical gimbal which carries the mirror support and which is provided with transverse slots which enable portions of the gimbal to rotate about transverse axes located in selected areas of the gimbal, and screw-type adjusting means for imparting the desired rotary motion to the cylinder and for consequently angularly adjusting the mirror with respect to the longitudinal axis of the cavity.

2

In one modification of the invention, the transverse slots in the cylinder or gimbal are oriented at right angles to each other in different planes, and the cylinder is provided with at least two laterally extending lever arms which receive the adjusting screws. In another embodiment the cylinder is provided with slots which are angled so that the axes of rotation both lie in a common plane, and the mirror is supported in the same plane on a disc or plate through which the adjusting screws extend. With this latter device, the center of the reflecting surface of the mirror may be maintained constantly fixed in a given plane while the surface is being angularly adjusted.

Devices of this character provide efficient controlled adjustment without the undesirable backlash and other undesired characteristics of known devices. Another advantage of this device is that it can be counterbalanced such that any accelerations in any direction will not cause movement of change of the angle or position of the plane of the mirror surface.

Other advantages of this invention will become apparent from the following description taken in connection with the accompanying drawings, wherein:

FIG. 3 is an end view of the device shown in FIG. 2;

FIG. 4 is an enlarged side elevational view of a modification of the mirror supporting and adjusting device; and FIG. 5 is an axial sectional view of the device shown in FIG. 4.

Figure 1:
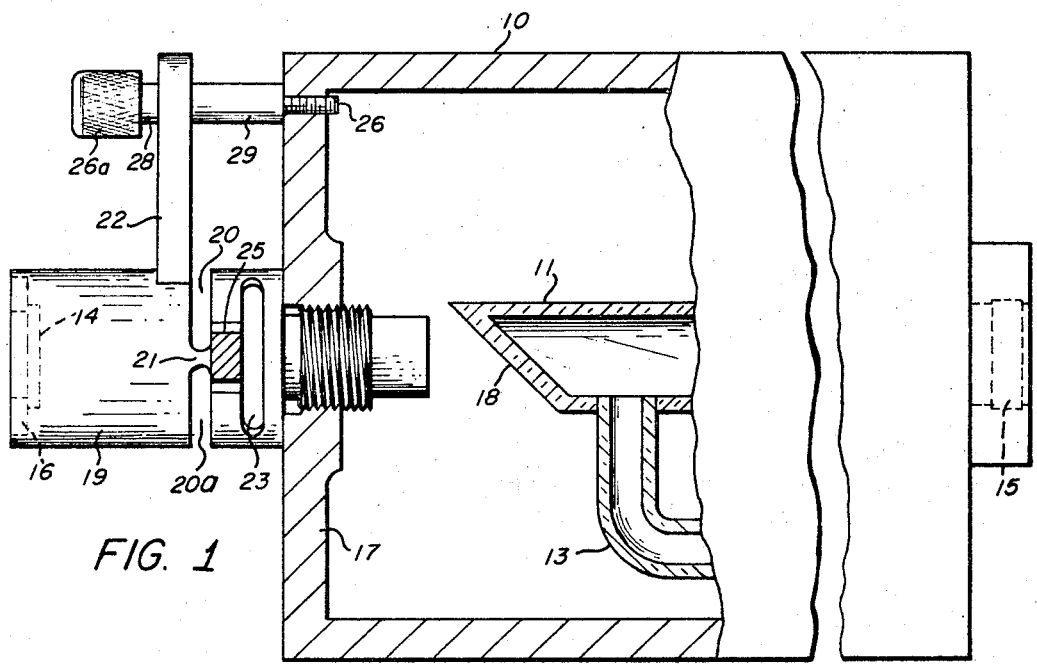
FIG. 1 is a side elevational view of a laser device embodying the invention with part of the device broken away to disclose the interior structure.

Referring more particularly to the drawing, wherein like characters of reference designate like parts throughout the several views, the laser structure of FIG. 1 is depicted pictorially and is not shown in great detail except insofar as the mirror mounting and adjusting device of the present invention is concerned.

Briefly, the laser is shown as being of the commonly known gas-filled type located within a suitable enclosure 10, although it should be understood that the invention may be used with other lasering devices such as those employing crystals or liquids as the radiation-producing materials. Within the enclosure is a hollow glass discharge tube 11 supported on the frame of the enclosure by suitable brackets and filled with a selected combination of gases such as a mixture of helium and neon. The gas mixture is adapted to be pumped or activated by suitable R.F., DC or other pumping means. Such pumping means is well known in the art, and, consequently, is not described in detail herein since it does not in itself form a part of the present invention. For information pertaining to R.F. pumping of gas lasers and the resultant production of coherent radiation, reference is made to p. 80 et seq. of "Lasers," by Bela A. Lengyel, published in 1962 by John Wiley & Sons, Inc., Library of Congress Catalog Card Number 63-9430.

The present discharge tube 11 is adapted particularly to be pumped by DC discharge between two electrodes (not shown) adjacent the tube 11 and connected with the interior thereof at the ends as by communicating tubulations 13.

For the present description it is sufficient to state that pumping produces collision between the atoms of the gases, which causes population inversion between two different energy levels, such transition producing electromagnetic radiation which bounces back and forth between mirrors 14 and 15 located at opposite ends of the device. The mirrors are adapted to reflect radiation falling upon them back into the gas mixture so that self-oscillation occurs. One mirror is made wholly reflective while the other is made partially reflective. Thus, an output beam of coherent electromagnetic radiation is permitted to escape through the partially reflective mirror.

The mirrors 14 and 15 may be constructed in any suitable manner such as by providing quartz discs with dielectric reflective coatings on their inner surfaces. The mirrors may be flat and, consequently, should be maintained in plane parallel relationship, or they may be spherical confocal mirrors in which case it is important that they be adjusted so that their radii of curvature are properly aligned to within seconds of arc. The mirrors 14–15 shown in FIG. 1 are flat, with mirror 15 being suitably fixed to one end of the frame 10 while mirror 14 is adjustably mounted on the opposite end of the frame. Although only one mirror is shown and described herein as being adjustable, it is understood that both may be adjustable if desired.

Mirror 14 is cemented or otherwise suitably affixed to a supporting member 16 which may be a plate, disc or ring which is positioned substantially parallel to the adjacent end wall 17 of the enclosure 10. The assembly is so located that radiation emitted from the adjacent end 18 of the discharge tube 11 will pass to mirror 14 through an opening in end wall 17.

While this invention pertains particularly to means for providing a fine angular adjustment of the mirror, it is to be understood that additional means may be provided either separately or in conjunction with this invention for providing an initial coarse adjustment.

Figure 2:
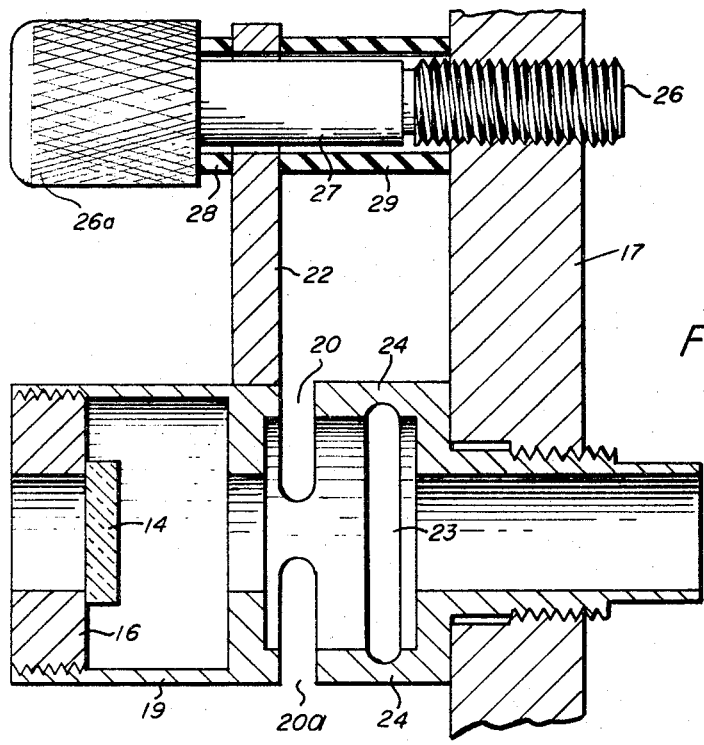
FIG. 2 is an enlarged axial sectional view of the mirror supporting and adjusting device illustrated in FIG. 1.

Support member 16 which carries mirror 14 is mounted as by threading into the outer end of a substantially tubular cylinder or gimbal 19, as shown in FIG. 2. The opposite end of the cylinder 19 is fixedly mounted on the end wall 17 as by threading into the aperture therein. Substantially midway of the length of the cylinder are provided two opposed transverse slots 20 and 20a which extend in a plane toward one another and are of a depth which provides a relatively narrow portion 21 of material of the cylinder between each of the adjacent ends of the slots. Fixedly attached to the cylinder is a transversely or radially extending lever arm 22 which is adapted to be moved toward and away from end wall 17. The inner end of arm 22 is fixed to cylinder 19 at a point between the slots 20–20a and the outer end of the cylinder. Thus, movement of the lever arm 22 toward or away from end wall 17 will cause bending movement of the cylinder around a transverse axis which passes through connecting portions 21, thus inclining the plane of the reflecting surface of the mirror 14.

To provide additional motion of the cylinder and mirror about an axis extending at right angles to the axis formed by portions 21, there are provided two additional opposed transverse slots 23 which, in FIG. 2, are indicated as being disposed between slots 20–20a and end wall 17. While only one slot 23 is shown in FIG. 2, it is to be understood that a second opposing slot is provided in the cylinder in the same manner as slots 20–20a, and that the slots 23 are connected at each end by a narrow portion 24 of the material of the cylinder. Slots 23 are disposed at right angles from slots 20–20a; that is, if slots 20 and 20a are considered as being directed into the cylinder from directions north and south, slots 23 may be considered as extending into the cylinder from directions east and west. Thus, there is provided a transverse axis formed by connecting portions 24, which axis extends at right angles to the axis through portions 21. To provide adjustment of the cylinder about this second axis, there is provided a second lever arm 25, shown in FIGS. 1 and 3, which lever arm 25 is fixed to the cylinder at a point between slots 20–20a and 23 and extends transversely or radially therefrom. Arm 25, like arm 22, is also movable toward and away from end wall 17, causing flexure or pivotal movement of the cylinder about the axis formed by connecting portions 24 but in a path which is disposed at right angles to the path of movement resulting from the first above-described adjustment.

Each arm is adapted to be moved by means shown best in FIG. 2 wherein the outer end of arm 22 is shown as being connected to end wall 17 by an adjusting screw 26. Screw 26 is threaded into end wall 17 and is adapted to be rotated by manual manipulation of a head portion 26a. The shank portion 27 of screw 26 extends freely through an opening in the lever arm 22. Suitable rubber or other resilient bushings or shock absorbing devices 28 and 29 are mounted over the shank portion 27 of the screw on opposite sides of lever arm 22. Such bushings are compressible or pliable so that movement of the screw, and consequently of the lever arm, is achieved.

In this way, it will be understood that the reflecting surface of mirror 14 can be adjusted as desired with respect to the longitudinal axis of the device while retaining the center of the mirror substantially in its initially adjusted plane, so as to properly receive radiation from the discharge tube 11 and to properly direct such radiation as a reflected beam back into the tube 11 through end wall 18 thereof along the proper selected path. It is to be understood that the material from which the cylinder or gimbal is made is relatively rigid, such as plastics, ceramics or metals such as aluminum, brass or stainless steel. For small angular movements which do not exceed the material strain point (determined by Young's modulus and the amount of material retained between the slots) the material will not break and will tend to return to its original fabricated position or shape.

FIG. 3 is an end view of the device shown in FIG. 2 and is to be read in conjunction therewith, whereupon it will be apparent that an efficient and sensitive adjustment of the mirror may be achieved in accordance with the objectives of this invention.

Another embodiment of this invention is illustrated in FIGS. 4 and 5. In this embodiment, it has been found that even greater sensitivity and accuracy are achieved than with the structure of FIGS. 1–3. End wall 17 has secured to it, as by screws 30 or the like, a cylinder or gimbal 31 provided with a first pair of opposed transverse angularly extending slots 32 and 32a and a second pair of opposed transversely extending slots 33 and 33a. However, in this embodiment, the short connecting portions 34 and 35 of the cylinder between the slots in the respective pairs thereof, which portions comprise the two transverse axes of radiation, both lie in a common plane indicated by line 36. In this particular construction, the reflecting surface of mirror 37 lies in plane 36 (FIG. 5), mirror 37 being preferably mounted on the adjacent end of a projection 38 which is carried on the inner surface of a disc or plate 39, radially extending lever arms 40 are carried by the gimbal as described in connection with FIG. 2. Screws, pins or other means 41 are provided for attaching the plate 39 to the end of cylinder 31 and for providing both lateral and longitudinal alignment. Lever arms 40 are preferably provided as a plurality of radially extending members substantially equidistant apart, and are adjustably attached to end wall 17 by adjusting screws such as shown, for example, in FIG. 2, whereby they may be moved toward and away from end wall 17 as indicated by arrows in FIGS. 4 and 5.

Adjustment of one or more of the arms with respect to end wall 17 will, consequently, tilt the reflecting surface of mirror 37 about one or both of the crossed axes lying in plane 36. Universal tilting adjustment is provided, while the center of the mirror is substantially retained in this plane. This provides an extremely efficient and sensitive adjustment which is not subject to backlash and is especially useful in installations where the laser device is subject to vibrations or mechanical shock. This structure possesses all of the hereinbefore mentioned advantages over known prior art devices.

Although preferred embodiments of the invention have been shown and described, it will be apparent that various modifications and changes may be made by those skilled in the art, such as providing suitable flexible dust shields over the slots to prevent contamination of the mirror surface, for example, without departing from the spirit of the invention as expressed in the accompanying claims. Accordingly, all matter shown and described should be considered as illustrative and not in a limiting sense.

We claim:
1. A laser structure comprising:
   a radiation producing medium defining a resonant cavity having a longitudinal axis;
   reflecting means at each end of the cavity for reflecting radiation from said medium back into the cavity;
   said reflecting means at one end of the cavity comprising a mirror positioned in the path of said radiation,
   a rigid member adjacent and spaced from said mirror,
   a mount supporting the mirror and movable therewith,
   and means for supporting said mount and angling said mirror thereon with respect to said longitudinal axis of the cavity comprising
   a tubular gimbal fixed at one end to the rigid member with the mount being positioned upon the other end, the gimbal having first and second pairs of opposed transverse slots therein, the slots comprising the first pair extending into the gimbal from opposite sides thereof with their inner ends terminating adjacent one another and connected by portions of the gimbal which comprise a first axis, and the slots comprising the second pair extending into the gimbal from opposite sides thereof and at right angles to the first pair of slots with their ends terminating adjacent one another and connected by portions of the gimbal which comprise a second axis,
   and means for moving said gimbal about at least one of said axes for adjusting the mirror with respect to said axis.

2. A laser structure substantially as set forth in claim 1 wherein said means for moving the gimbal comprises at least two lever arms affixed at one end to the gimbal and extending radially therefrom, and adjusting devices at the opposite ends of the arms and connected to the rigid member for moving the arms toward and away from the rigid member.

3. A laser structure substantially as set forth in claim 1 wherein said gimbal is or relatively rigid material whereby the center of the mirror is retained substantially in a fixed plane during an adjusting operation.

4. A laser structure comprising:
   a radiation producing medium defining a resonant cavity having a longitudinal axis;
   reflecting means at each end of the cavity for reflecting radiation from said medium back into the cavity;
   said reflecting means at one end of the cavity comprising a mirror positioned in the path of said radiation,
   a rigid member adjacent and spaced from said mirror,
   a mount supporting the mirror and movable therewith,
   and means for supporting said mount and angling said mirror thereon with respect to said longitudinal axis of the cavity comprising
   a tubular gimbal fixed at one end to the rigid member with the mount being positioned upon the other end, the gimbal having first and second pairs of opposed transverse slots therein, the slots comprising the first pair extending into the gimbal along a common first plane from opposite sides thereof with their inner ends terminating adjacent one another and connected by portions of the gimbal which comprise a first axis, and the slots comprising the second pair extending into the gimbal along a common second plane from opposite sides thereof and at right angles to the first pair of slots with their ends terminating adjacent one another and connected by portions of the gimbal which comprise a second axis,
   and means for moving said gimbal about at least one of said axes for adjusting the mirror with respect to said axis.

5. A laser structure substantially as set forth in claim 4 wherein the mirror is located in a plane remote from said first and second planes in which lie said slots.

6. A laser structure substantially as set forth in claim 4 wherein said means for moving the gimbal comprises at least two lever arms affixed at one end to the gimbal and extending radially therefrom, and adjusting devices at the opposite ends of the arms and connected to the rigid member for moving the arms toward and away from the rigid member.

7. A laser structure substantially as set forth in claim 6 wherein two lever arms are provided, the first lever arm being affixed to the gimbal at a point between the respective pairs of slots, and the second lever arm being affixed to the gimbal at a point between the slots and the movable end of the gimbal.

8. A laser structure substantially as set forth in claim 7 wherein said lever arms extend radially from the gimbal substantially at right angles to one another.

9. A laser structure comprising:
   a radiation producing medium defining a resonant cavity having a longitudinal axis;
   reflecting means at each end of the cavity for reflecting radiation from said medium back into the cavity;
   said reflecting means at one end of the cavity comprising a mirror positioned in the path of said radiation,
   a rigid member adjacent and spaced from said mirror,
   a mount supporting the mirror and movable therewith,
   and means for supporting said mount and angling said mirror thereon with respect to said longitudinal axis of the cavity comprising
   a tubular gimbal fixed at one end to the rigid member with the mount being positioned upon the other end, the gimbal having first and second pairs of opposed transverse slots therein, the slots comprising the first pair extending into the gimbal from opposite sides thereof with their inner ends terminating adjacent one another and connected by portions of the gimbal which comprise a first axis lying in a given plane, and the slots comprising the second pair extending into the gimbal from opposite sides thereof and at right angles to the other pair of slots with their ends terminating adjacent one another and connected by portions of the gimbal which comprise a second axis lying in the same plane as said first axis and at right angles to said first axis,
   and means for moving said gimbal about at least one of said axes for adjusting the mirror with respect to said axis.

10. A laser structure substantially as set forth in claim 9 wherein the center of the reflecting surface of the mirror is disposed in the same plane of said axes.

11. A laser structure substantially as set forth in claim 9 wherein the mount is provided on its inner surface with an inwardly extending fixed mirror support, and the mirror is affixed thereto with the center of its reflecting surface lying in said plane of said axes.

12. A laser structure substantially as set forth in claim 9 wherein said mount which supports the mirror comprises a plate positioned upon the end of the gimbal, and the means for moving the gimbal comprises a plurality of lever arms extending radially from the gimbal, and adjusting devices at the outer ends of the arms and connected to the rigid member for moving the arms toward and away from the rigid member.

13. A laser structure substantially as set forth in claim 12 wherein said lever arms are connected to the plate.

References Cited

UNITED STATES PATENTS 2,461,190  2/1949  Wolff.
3,277,396  10/1966  Statz et al. _____ 331—94.5

OTHER REFERENCES

Martin et al.: JOSA, vol. 37, No. 11 (November 1947), p. 926.

JEWELL H. PEDERSEN, *Primary Examiner.*

W. L. SIKES, *Assistant Examiner.*

U.S. Cl. X.R.

248—487; 350—252, 285, 304